United States Patent [19]

Chien et al.

[11] Patent Number: 5,756,614
[45] Date of Patent: May 26, 1998

[54] POLYPROPYLENE AND OTHER OLEFIN POLYMER THERMOPLASTIC ELASTOMERS, NOVEL CATALYST FOR PREPARING THE SAME AND METHOD OF PREPARATION

[75] Inventors: James C. W. Chien; Marvin D. Rausch, both of Amherst, Mass.

[73] Assignee: Academy of Applied Science, Concord, N.H.; a part interest

[21] Appl. No.: 383,549

[22] Filed: Feb. 3, 1995

Related U.S. Application Data

[63] Continuation of Ser. No. 91,414, Jul. 15, 1993, abandoned, which is a continuation of Ser. No. 483,239, Mar. 2, 1990, abandoned.

[51] Int. Cl.$^6$ .......................... C08F 4/642; C08F 110/06
[52] U.S. Cl. .......................... 526/160; 502/103; 502/117; 526/351; 526/943
[58] Field of Search .......................... 526/160, 351

[56] References Cited

U.S. PATENT DOCUMENTS

| | | | |
|---|---|---|---|
| 3,175,999 | 3/1965 | Nalter et al. | 526/351 |
| 3,258,455 | 6/1966 | Nalter et al. | 526/351 |
| 3,511,824 | 5/1970 | Listner | 525/333.8 |
| 3,784,502 | 1/1974 | Gobran et al. | 524/474 |
| 4,335,225 | 6/1982 | Collatte et al. | 526/351 |
| 4,522,982 | 6/1985 | Ewen | 526/351 |
| 4,841,004 | 6/1989 | Kaminsky et al. | 526/351 |
| 4,849,487 | 7/1989 | Kaminsky et al. | 526/351 |
| 4,892,851 | 1/1990 | Ewen et al. | 556/53 |
| 4,971,936 | 11/1990 | Wilson et al. | 526/124 |
| 5,270,410 | 12/1993 | Job | 526/124 |

FOREIGN PATENT DOCUMENTS

| | | | |
|---|---|---|---|
| 129368 | 12/1984 | European Pat. Off. | 526/160 |
| 3826075 | 2/1990 | Germany | 526/160 |

OTHER PUBLICATIONS

Legge et al. Thermoplastic Elastomers, A Comprehensive Review, Macmillan, NY (1987) pp. 103-113.

*Primary Examiner*—Edward J. Smith
*Attorney, Agent, or Firm*—Rines and Rines

[57] ABSTRACT

A thermoplastic elastomeric polypropylene (and other olefin homopolymerized polymers) using a novel catalyst with a single monomer olefin, and method of preparing the same to produce a chain of alternating stereo regular crystallizable segments and stereo-irregular non-crystallizable polymerized segments, the former acting as physical crosslinks between the non-crystallizable segments to form a thermoplastic elastomeric material having good elastomeric properties.

4 Claims, No Drawings

POLYPROPYLENE AND OTHER OLEFIN POLYMER THERMOPLASTIC ELASTOMERS, NOVEL CATALYST FOR PREPARING THE SAME AND METHOD OF PREPARATION

This is a continuation of application Ser. No. 91,414, filed Jul. 15, 1993 which is a file wrapper continuation application of Ser. No. 483,239, filed Feb. 3, 1990 both abandoned.

The present invention relates to thermoplastic elastomers such as polypropylene and related polyolefin types, being more specifically concerned with polypropylenes exhibiting elastomeric properties and catalysts for making the same.

BACKGROUND

Tullock and co-workers (Tullock, C. W.; Tebbe, F. N.; Mulhaupt, R.; Overall, D. W.; Seltarquist, R. A.; Ittal, S. D. *J. Polym. Sci. Part A* 1989 27 3063; Colleta, J. C.; Tullock, C. W.; MacDonald, R. N.; Buck, W. H.; Su, A. C. L.; Harrel, J. R.; Mulhaupt, R.; Anderson, B. C.; *Macromolecules* 1989 22 2851), have obtained polypropylenes exhibiting elastomeric properties using alumina-supported bis(arene) Ti, Zr and Hf catalysts with materials of heterogeneous composition comprising chains soluble in ethyl ether, hexane, heptane and octane, as well as octane-insoluble ones. Each fraction contains polypropylene chains considered to be uniform in structure. The total polymer exhibits poor elastomeric properties. Hysterisis effects showing 110% permanent set after 300% elongation were obtained. Ewen et al and Kaminsky et al.

(Ewen, J. A. *J. Am. Chem. Soc.* 1984 106, 6355.; Ewen, J. A. "Ligand Effects on Metallocene Catalyzed Polymerizations", in Catalytic Polymerization of Olefins; Keii, T.; Soga, K., Eds.; Elsevier, N.Y., 1986, p. 271; (c) Ewen, J. A.; Haspeslagh, L.; Atwood, J. L.; Zhang, H. *J. Am. Chem. Soc.* 1987 109 6544; Kaminsky, W.; Kuiper, K.; Brintzinger, H. H.; Wild, F. R. W. P. *Angew. Chem. Int. Ed. Engl.* 1985-24 507), described symmetrical ansa-metallocene compounds which also produce heterogenous mixture of polypropylenes; examples are rac-ethylene bis (indenyl) zirconium dichloride and rac-ethylene bis (tetrahydroindenyl) zirconium dichloride. We have discovered new nonsymmetric ansa-metallocene systems, exemplified by rac-ethylidene (1 η$^5$-tetramethylcyclopentadienyl) (1-η$^5$-indenyl)-dichlorotitanium (1) which produces homogeneous homopolypropylene having the attributes of a thermoplastic elastomeric (TPE) material, which properties are derived from intrinsic molecular characteristics of the macromolecular chain, and, unlike the heterogenous polymers of Tullock et al, which have poor elastomeric properties resulting from the blend of amorphous and stereo regular polypropylenes.

OBJECT OF INVENTION

A principal object of this invention, accordingly, is to provide a new thermoplastic elastomeric material of the olefin class and one that can be produced with a single monomer and a novel method of producing the same.

A further object is to provide a novel thermoplastic elastomeric polypropylene material.

Still a further object is to provide new catalysts for forming such novel products.

Other and further objects will be explained hereinafter and are more particularly delineated in the appended claims.

SUMMARY

In summary, however, from one of its important aspects, the invention embraces a novel catalytic new composition of matter of formula rac-ethylidene (1-η$^5$tetramethylcyclopentadienyl) (1-η$^5$-indenyl) dichloro-M, where M is a metal selected from the group consisting of Ti, Zr and Hf. The invention also involves novel thermoplastic elastomeric olefin products including a thermoplastic elastomeric olefin polymer having alternate blocks of homopolymerized stereo regular crystallizable segments and of homopolymerized stereo irregular non-crystallizable amorphous segments, the former segment aggregating into crystalline domains to act as physical crosslinks, thus enabling elastic recovery of stretched specimens upon release of the strain. Preferred and best mode embodiments, formations and method for carrying out the same are hereinafter set forth in detail.

Turning first to the method of forming the novel catalyst and single olefin thermoplastic elastomeric products of the invention. A reaction between 1,2,3,4,6-pentamethylfulvene and indenyllithium was produced in THF solution, followed by hydrolysis and distillation, affording 1-(1-indenyl)-1-(2, 3,4,5-tetramethylcyclopentadienyl)ethane (2) (b.p. 130°–140° C./0.1 Torr) in 54% yield [anal. (calcd): C, 90.63 (90.85); H, 9.25 (9.15)]. This golden orange oil 2 is an isomeric mixture according to $^1$H and $^{13}$C NMR. A solution of 2 (13 mmol) in 150 mL of THF was cooled to 0° C., n-butyllithium (26 mmol) was added dropwise, and stirred for several h at 40° C. to from a deep red solution. It was cooled to –78° C., and 13 mmol of TiCl$_4$(THF)$_2$ in THF was added dropwise. Subsequent refluxing for 18 h gave a green solution. Removal of the solvent, extraction with CH$_2$Cl$_2$, filtration, and removal of the CH$_2$Cl$_2$ gave 4.7 g of 1 in 95% crude yield. The product was purified by crystallization from CH$_2$Cl$_2$/n-hexane, MS m/e 381 for M+; [anal. (calcd): C, 61.41 (63.02); H, 5.70 (5.82)]. The $^1$H and $^{13}$C NMR spectra indicate that only one of the two possible diasteromeric pairs is isolated, with the probable structure shown based on steric considerations.

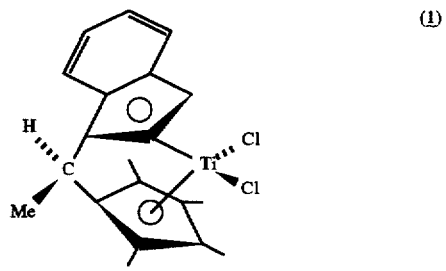

(1)

The above formula can be expressed as Rac-ethylidene (1-η$^5$-tetramethylcyclopentadienyl) (1-η$^5$-indenyl) dichlorotitanium. As will later be explained the titanium may be replaced by other group 4 metals.

The novel catalyst (1, M+Ti) thus prepared was then used to catalyze the propylene polymerization product of the invention as follows:

Polymerization of propylene at 1.5 atm and 30° C. with 27 μM of 1 and 54 mM of MAO$^9$ based on Al and 1 h gave 0.74 g of polypropylene (3) which corresponds to a catalytic activity of 2.5×10$^3$ g PP/(mol Ti.h-atm). Polymerization at 25° C. also yielded polypropylene (4). Polymers 3 and 4 were subjected to solvent fractionation. $^{10}$ Aside from a very small amount of acetone soluble material, the polymers are completely soluble in refluxing ethyl ether indicating uniformity of structure. They are also characterized by narrow molecular weight distributions. According GPC using columns calibrated with polypropylene of known $\overline{M}_n$ $\overline{M}_w$, 3 has $\overline{M}_n$=66.603, $\overline{M}_w$=127.000 and $\overline{M}_w/\overline{M}_n$=1.9 and 4 has $\overline{M}_n$=98.400, $\overline{M}_w$=164.000 and $\overline{M}_w/\overline{M}_n$=1.7. The degree of crystallinity was found by Roland analysis X-ray powder patterns obtained on samples annealed between 30° and 45° C. to be 28.6±0.5% and 26.5±0.4% for 3 and 4, respectively. The polymers exhibit more than one melting endotherm; the transition temperature ($T_m$), and enthalpy ($\Delta H_f$) obtained by DSC on samples annealed at 30° C. for 12 h are given in Table 1. Annealing at lower temperatures resulted in lower $T_m$, which indicates a dependence of the size and order of crystalline domains on crystalline conditions.

The dynamic storage modulus (G') measured at 1 rad S$^{-1}$ as a function of temperature showed a three orders of magnitude decrease between 60° and 80° C. due to the melting transitions. G' increases only slightly with frequency at 50° C. but increases strongly with frequency at 100° C., indicating an elastomeric state in the former but a single phase melt state in the latter. Stress-strain curves obtained on dogbone samples (molded at 100° C., annealed at 60° C. for 2 h) showed very stong mechanical properties (Table 1). In particular, 4 did not break until stretched beyond 1260%. The polymers exhibit excellent elastic recoveries (Table II); the strain recovery is better than 90% for 4 elongation of 100–300%. These properties can be explained only by the presence of physical crosslinks due to crystallization of stereoregular segments of the polypropylene chains. The molecular weight between crosslinks ($\overline{M}_c$) was estimated from the equilibrium modulus ($G_{eq}$) which was measured at 50° C., 0.5% strain, and stress relaxed for 10$^4$ sec (Table I). The estimates for $\overline{M}_c$[=(density) RT/$G_{eq}$] are 2.0×10$^3$ and 4.4×10$^3$ for 3 and 4, respectively. Since the crystallizable segments in the polymer chains must be quite short as indicated by the low $T_m$, there are many alternating crystallizable and noncrystallizable segments, of the order of twenty. These polymers contain only low-homosteric pentad populations.

For syndiospecific propylene polymerization using isopropyl (cyclopentadienyl-1-fluorenyl)-dichlorohafnium, there is a known chain migration following each monomer insertion. The bridging carbon in the novel catalyst 1, however, is chiral and can have the polymer chain either syn (1a) or anti (1b) to the ansa-methyl group during polymerization.

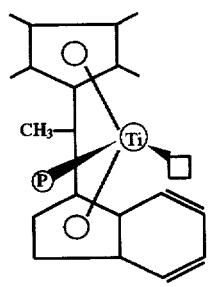

1a

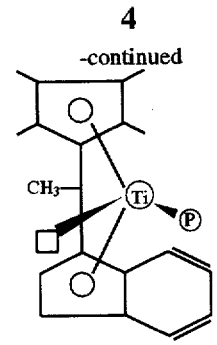

1b

The block or segment structure of the present TPE polypropylene may be explained by postulating that during chain propagation on 1a and 1b they undergo occasional interconversion.

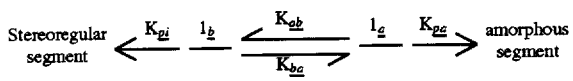

where $k_p$'s are greater than $k_{ab}$, and $k_{ba}$. The resulting polymer is microphase separated into crystalline and amorphous domains, and the former act as physical crosslinks. Above $T_m$, the polymers become linear viscoelastic-capable of being extruded, molded or otherwise processed like thermoplastics.

The above results demonstrate that the novel catalyst 1 can produce polypropylene chains containing alternating crystallizable and non-crystallizable segments in any given chain. The polymers are quite homogeneous in structure as well as MW. This is believed to be the first example of a thermoplastic elastomer comprised of a single monomer.

TABLE I

Mechanical and thermal properties of TPE polypropylenes

| Sample | 3 | 4 |
|---|---|---|
| Strength, MPa | 3.97 | 12.1 |
| Strain to break, % | 525 | 1260 |
| Recovery after break, % | 86 | 94 |
| $G_{eq}$, MPa | 1.47 | 0.56 |
| $T_m$*, °C. | 51.2, 66.0 | 53.1, 63.8 |
| $\Delta H_f$*, cal g$^{-1}$ | 3.26 | 2.93 |

*Samples annealed at 30° C. for 12 h before DSC scan.

TABLE II

Elastomeric properties of TPE polypropylenes

| Sample | 3 | | | 4 | | |
|---|---|---|---|---|---|---|
| Strain, % | 100 | 200 | 300 | 100 | 200 | 300 |
| Stress, MPa | 3.13 | 3.39 | 3.53 | 3.07 | 3.30 | 3.59 |
| Recovery, % | 93 | 91 | 83 | 97 | 96 | 92 |

While the catalyst above described (1) uses Ti, as before pointed out, Zr and Hf (group 4 metals) are also useful therein. In all such instances, in one quadrant of the paths ansa-metallocene complex the monomer inserts into the growing chain in a stereo-regular fashion to produce crystallizable isotactic segments or blocks; whereas when the chain migrates into the other quadrant of the ansa-metallocene complex characterized by reduced stereo-selectivity and polymerization growth is stereochemically irregular into amorphous segments in blocks which cannot be crystallized, such that the elastomeric blocks are held between the solid crystallized segments or blocks and enable the snapping back when elongated or stretched. The growth occurs first for a while in the stereo-selective mode, and then in the stereo-nonselective mode, with the resulting chain containing, as before stated, about twenty such alternating segments or blocks in the homopolymerized product.

Though above-described in connection with polypropylene

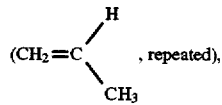

other α-olefin monomers may also similarly be rendered into thermoplastic elastomers with the catalysts of the invention, including 4-methyl-hexene, 4-methyl-heptene and 3-methyl-pentene.

Further modifications will occur to those skilled in the art, and all such as considered to fall within the spirit and scope of the invention as defined in the appended claims.

What is claimed is:

1. A thermoplastic elastomeric propylene polymer chain having only alternate blocks of a homopolymerized single propylene monomer that contains alternating stereo-regular crystallizable isotactic polymerized blocks and stereo-irregular non-crystallizable polymerized blocks and with uniformity of structure, the former providing physical crosslinks between the non-crystallizable blocks which impart elastomeric properties with a range of recovery from 93 to 97% after 100% elongation strain, and with of the order of twenty monomer units in each of the attenuating blocks, providing x-ray measured crystallinity with a range of 26.5 to 28.6%.

2. A method of forming a thermoplastic elastomeric propylene polymer, that comprises, in the presence of MAO, homopolymerizing a single monomer only of propylene with a non-symmetrical catalyst of the formula rac-ethylidene) 1-$\eta^5$-tetra methylcyclopentadienyl) (1-$\eta^5$-indenyl) dichloro-M, where M is a metal selected from the group consisting of Ti, Zr and Hf.

3. A method as claimed in claim 2 wherein the propylene is polymerized, with one propagation path of the non-symmetric catalyst creating of the order of twenty monomer units in stereo-selective crystallized blocks in the resulting chain and the other propagation path creating of the order of twenty monomer units in irregular non-crystallizable blocks.

4. A method as claimed in claim 2 wherein the propylene is polymerized with one path of the catalyst creating stereo-selective blocks in the resulting chain and the other propagation path creating irregular non-crystallizable blocks.

* * * * *